| United States Patent [19] | [11] Patent Number: 4,820,403 |
| Gutberlet et al. | [45] Date of Patent: Apr. 11, 1989 |

[54] HYDROCRACKING PROCESS

[75] Inventors: L. Charles Gutberlet, Wheaton; Jeffrey T. Miller, Naperville, both of Ill.

[73] Assignee: Amoco Corporation, Chicago, Ill.

[21] Appl. No.: 124,280

[22] Filed: Nov. 23, 1987

[51] Int. Cl.[4] ............................................. C10G 47/16
[52] U.S. Cl. ..................................... 208/111; 208/112; 208/68; 502/64; 502/314; 502/315
[58] Field of Search .................. 208/111, 68, 112; 502/64, 314, 315

[56] References Cited

U.S. PATENT DOCUMENTS

| 4,120,825 | 10/1978 | Ward | 502/66 |
| 4,401,556 | 8/1983 | Bezman et al. | 208/111 |
| 4,419,271 | 12/1983 | Ward | 502/79 |
| 4,503,023 | 3/1985 | Breck et al. | 502/60 |
| 4,556,478 | 12/1985 | Shiori et al. | 208/111 |
| 4,576,711 | 3/1986 | Ward et al. | 208/111 |
| 4,585,545 | 4/1986 | Yancey et al. | 208/68 |
| 4,648,958 | 3/1987 | Ward | 208/111 |
| 4,676,887 | 6/1987 | Fischer et al. | 208/68 |

Primary Examiner—Anthony McFarlane
Attorney, Agent, or Firm—Ekkehard Schoettle; William H. Magidson; Ralph C. Medhurst

[57] ABSTRACT

A hydrocarbon conversion process is disclosed involving the hydrocracking of a catalytic cycle oil in the presence of a catalyst having a nickel component, a tungsten component, and a support component containing a crystalline molecular sieve material present in an amount ranging from 25 to 60 wt. % based on the weight of the support component with the balance being alumina.

15 Claims, No Drawings

HYDROCRACKING PROCESS

BACKGROUND OF THE INVENTION

The present invention relates to a hydrocarbon conversion process. More particularly, this invention relates to the catalytic hydrocracking of hydrocarbons.

The hydrocracking of hydrocarbons is old and well-known in the prior art. These hydrocracking processes can be used to hydrocrack various hydrocarbon fractions such as reduced crudes, gas oils, heavy gas oils, topped crudes, shale oil, coal extract and tar extract wherein these fractions may or may not contain nitrogen compounds. Modern hydrocracking processes were developed primarily to process feeds having a high content of polycyclic aromatic compounds, which are relatively unreactive in catalytic cracking. The hydrocracking process is used to produce desirable products such as turbine fuel, diesel fuel, and middle distillate products such as naphtha and gasoline.

The hydrocracking process is generally carried out in any suitable reaction vessel under elevated temperatures and pressures in the presence of hydrogen and a hydrocracking catalyst so as to yield a product containing the desired distribution of hydrocarbon products.

Hydrocracking catalysts generally comprise a hydrogenation component on an acidic cracking support. More specifically, hydrocracking catalysts comprise a hydrogenation component selected from the group consisting of Group VIA metals and Group VIII metals of the Periodic Table of Elements, their oxides or sulfides. The Prior art has also taught that these hydrocracking catalysts contain an acidic support comprising a crystalline alumino silicate material such as X-type and Y-type alumino silicate materials. This crystalline aluminosilicate material is generally suspended in a refractory inorganic oxide such as silica, alumina, or silica-alumina.

The preferred Group VIA metals are tungsten and molybdenum the preferred Group VIII metals are nickel and cobalt.

The prior art has also taught that combinations of metals for the hydrogenation component, expressed as oxides and in the order of preference, are: $NiO-WO_3$, $NiO-MoO_3$, $CoO-MoO_3$, and $CoO-WO_3$.

Other hydrogenation components broadly taught by the prior art include iron, ruthenium, rhodium, palladium, osmium, indium, platinum, chromium, molybdenum, vanadium, niobium, and tantalum.

References that disclose hydrocracking catalysts utilizing nickel and tungsten as hydrogenation components, teach enhanced hydrocracking activity when the matrix or catalyst support contains silica-alumina. For instance, U.S. Pat. Nos. 4,576,711, 4,563,434, and 4,517,073 all to Ward et al., show at Table V thereof that the lowest hydrocracking activity is achieved when alumina is used in the support instead of a dispersion of silica-alumina in alumina. The lowest hydrocracking activity is indicated by the hightest reactor temperature required to achieve 60 vol. % conversion of the hydrocarbon components boiling above a predetermined end point to below that end point.

Similarly, U.S. Pat. 3,536,605 to Kittrell et al. teaches the use of silica-alumina in the catalyst support when a nickel- and tungsten-containing hydrogenation component is employed.

U.S. Pat. No. 3,598,719 to White teaches a hydrocracking catalyst that can contain 0 wt. % silica, however, the patent does not present an example showing the preparation of a catalyst devoid of silica nor does the patent teach the preferential use of nickel and tungsten as hydrogenation metals.

As can be appreciated from the above, there is a myriad of catalysts known for hydrocracking whose catalytic properties vary widely. A catalyst suitable for maximizing naptha yield may not be suitable for maximizing the yield of turbine fuel. Further, the degree of cracking and yield structure is also dependent upon the feedstock composition.

Catalysts of high hydrogenation activity relative to acidity yield more highly saturated products as required in distillate fuels such as jet or aviation fuel.

Reconciling hydrodenitrogenation activity with hydrocracking activity in a single hydrocracking catalyst presents a difficulty. For instance when a feedstock having a high nitrogen content is exposed to a hydrocracking catalyst containing a high amount of cracking component the nitrogen serves to poison or deactivate the cracking component. Thus, hydrodenitrogenation (HDN) catalysts do not possess a high cracking activity since they are generally devoid of a cracking component that is capable of being poisoned. Another difficulty is presented when the hydrocracking process is used to maximize naphtha yields from a feedstock containing light catalytic cycle oil which has a very high aromatics content. The saturation properties of the catalyst must be carefully gauged to saturate only one aromatic ring of a polynuclear aromatic compound such as naphthalene in order to preserve desirable high octane value aromatic-containing hydrocarbons for the naphtha fraction. If the saturation activity is too high, all of the aromatic rings will be saturated and subsequently cracked to lower octane value paraffins.

On the other hand, distillate fuels such as diesel fuel or aviation fuel have specifications that stipulate a low aromatics content. This is due to the undesirable smoke production caused by the combustion of aromatics in diesel engines and jet engines.

Prior art processes designed to convert high nitrogen content feedstocks and produce jet fuel as usually two stage processes wherein the first stage is designed to convert organic nitrogen compounds to ammonia prior to contacting with a hydrocracking catalyst which contained a high amount of cracking component; i.e., a molecular sieve material.

For instance U.S. Pat. No. 3,923,638 to Bertolacini et al. discloses a two catalyst process suitable for converting a hydrocarbon containing substantial amounts of nitrogen to saturated products adequate for use as jet fuel. Specifically, the subject patent discloses a process wherein the hydrodenitrogenation catalyst comprises as a hydrogenation component a Group VIA metal and group VIII metal and/or their compounds and a cocatalytic acidic support comprising a large-pore crystalline aluminosilicate material and refractory inorganic oxide. The hydrocracking catalyst comprises as a hydrogenation component a Group VIA metal and a Group VIII metal and/or their compounds, and an acidic support of large-pore crystalline aluminosilicate material. For both hydrodenitrogenation catalyst and the hydrocracking catalyst, the preferred hydrogenation component comprises nickel and tungsten and/or their compounds and the preferred large-pore crystalline aluminosilicate material is ultrastable, largepore crystalline aluminosilicate material.

Thus there is a need for single catalyst that possesses high hydrodenitrogenation, hydrocracking, and polyaromatic saturation activity. Specifically, there is a need for a catalyst that is capable of maximizing naphtha selectivity and octane value while concomitantly yielding a distillate fraction that possesses a suitably low aromatics content such that it can be blended to prepare or used directly as diesel fuel or jet fuel.

In accordance with the present invention, the hydrodenitrogenation, hydrocracking, and polyaromatic saturation activities are maximized in one catalyst when a feedstock containing highly aromatic light catalytic cycle oil is converted. Further, the process of the invention provides for increased selectivity towards high octane naphtha with decreased undesirable selectivity towards $C_1$ to $C_5$ light gas. Additionally, the aromatics content of the distillate product fraction is advantageously low.

SUMMARY OF THE INVENTION

This invention relates to a process for the hydrocracking and hydrodenitrogenation of a feedstock comprising a light catalytic cycle oil to a product having an increased naphtha fraction, which comprises reacting the feedstock with hydrogen at hydrocarbon hydrocracking conversion conditions in the presence of a catalytic composite comprising a combination of a nickel component, and a tungsten component, wherein the nickel component is present in an amount ranging from about 1 to about 10 wt. % and the tungsten component is present in an amount ranging from about 10 to 30 wt. % calculated as oxides and based on total catalyst weight. The catalytic composite also contains a support component comprising a crystalline molecular sieve material component, and an alumina component wherein the crystalline molecular sieve material is present in the support in an amount ranging from about 25 to 60 wt. % based on the weight of the support component.

DETAILED DESCRIPTION OF THE INVENTION

The hydrocarbon charge stock subject to hydrocracking in accordance with the process of this invention suitably comprises a light catalytic cycle oil. This light catalytic cycle oil generally has a boiling range of about 350° to about 750° F., a sulfur content of about 0.5 to about 2.5 wt %, a nitrogen content of about 0.01 to about 0.15 wt % and an aromatics content of about 30 to about 70 vol. %. The light catalytic cycle oil is a product of the fluidized cracking process.

Operating conditions to be used in the hydrocracking reaction zone include an average catalyst bed temperature within the range of about 500° to 1000° F., preferably 600° to 900° F. and most preferably about 650° to about 850° F., a liquid hourly space velocity within the range of about 0.1 to about 10 volumes hydrocarbon per hour per volume catalyst, a total pressure within the range of about 500 psig to about 5,000 psig, and a hydrogen circulation rate of about 500 standard cubic feet to about 20,000 standard cubic feet per barrel.

The process of the present invention is naphtha selective with decreased production of light gases. Further, the process of the invention provides for a distillate product fraction that is sufficiently low in aromatic content such that it can be used as a blending component to prepare or be directly used as diesel fuel or aviation fuel.

The process of the present invention is preferably carried out in a single reaction zone wherein the reaction zone can comprise a plurality of catalyst beds. Each catalyst bed can have intrabed quench to control temperature rise due to the exothermic nature of the hydrocracking reactions. The charge stock may be a liquid, vapor, or liquid-vapor phase mixture, depending upon the temperature, pressure, proportion of hydrogen, and particular boiling range of the charge stock processed. The source of the hydrogen being admixed can comprise a hydrogen-rich gas stream obtained from a catalytic reforming unit.

The catalyst used in the process of the present invention comprises a hydrogenation component and a catalyst support.

The hydrogenation component of the present invention comprises nickel and tungsten and/or their compounds. The nickel and tungsten are present in the amounts specified below. These amounts are based on the total catalytic composite or catalyst weight and are calculated as the oxides, NiO and $WO_3$. In another embodiment of the present invention, the hydrogenation component can additionally comprise a phosphorus component. The amount of phosphorus component is calculated as $P_2O_5$ with the ranges thereof also set out below.

|  | Broad | Preferred | Most Preferred |
| --- | --- | --- | --- |
| NiO, wt % | 1–10 | 1.5–5.0 | 1.5–4.0 |
| $WO_3$, wt % | 10–30 | 15–25 | 15–20 |
| $P_2O_5$, wt % | 0.0–5.0 | 0.0–2.0 | 0.0–1.0 |

The hydrogenation component may be deposited upon the support by impregnation employing heat-decomposable salts of the above-described metals or any other method known to those skilled in the art. Each of the metals may be impregnated onto the support separately, or they may be co-impregnated onto the support. The composite is subsequently dried and calcined to decompose the salts and to remove the undesired anions.

Another component of the catalytic composite or catlyst is the support. The support comprises a crystalline molecular sieve material and alumina. The preferred alumina is gamma alumina. The crystalline molecular sieve material is present in an amount ranging from about 25 to about 60 wt. %, preferably from about 35 to about 50 wt. %.

Preferably, the crystalline molecular sieve material is distributed throughout and suspended in a porous matrix of the alumina. The process of the present invention requires the use of alumina in the catalyst support in contradistinction to U.S. Pat. Nos. 4,576,711, 4,563,434, and 4,517,073 to Ward et al. and U.S. Pat. No. 3,536,605 to Kittrel et al. which require the presence of silica-alumina matrix material.

The support may be prepared by various well-known methods and formed into pellets, beads, and extrudates of the desired size. For example, the crystalline molecular sieve material may be pulverized into finely divided material, and this latter material may be intimately admixed with the gamma alumina. The finely divided crystalline molecular sieve material may be admixed thoroughly with a hydrosol or hydrogel of the gamma alumina. Where a thoroughly blended hydrogel is obtained, this hydrogel may be dried and broken into pieces of desired shapes and sizes. The hydrogel may also be formed into small spherical particles by conventional spray drying techniques or equivalent means.

Such molecular sieve materials can be selected from the group consisting of a faujasite-type crystalline aluminosilicate, a mordenite-type crystalline aluminosilicate, a ZSM-type crystalline aluminosilicate, and an AMS-type crystalline metallosilicate. Examples of a faujasite-type crystalline aluminosilicate are high- and low-alkali metal Y-type crystalline aluminosilicates, metal-exchanged X-type and Y-type crystalline aluminosilicates, and ultrastable, large-pore crystalline aluminosilicate material. Zeolon is an example of a mordenite-type crystalline aluminosilicate. An example of a ZSM-type crystalline aluminosilicate is ZSM-5 crystalline aluinosilicate. AMS-1B crystalline borosilicate is an example of an AMS-type crystalline metallosilicate.

Ultrastable, large-pore crystalline aluminosilicate material is represented by Z-14US zeolites which are described in U.S. Pat. Nos. 3,293,192 and 3,449,070. Each of these patents is incorporated by reference herein and made a part hereof. By large-pore material is meant a material that has pores which are sufficiently large to permit the passage thereinto of benzene molecules and larger molecules and the passage therefrom of reaction products. For use in petroleum hydrocarbon conversion processes, it is often preferred to employ a large-pore molecular sieve material having a pore size of at least 5 Å (0.5 nm) to 10 Å (1 nm).

The ultrastable, large-pore crystalline aluminosilicate material is stable to exposure to elevated temperatures. This stability in elevated temperatures is discussed in the aforementioned U.S. Pat. Nos. 3,293,192 and 3,449,070. It may be demonstrated by a surface area measurement after calcination at 1,725° F. In addition, the ultrastable, large-pore crystalline aluminosilicate material exhibits extremely good stability toward wetting, which is defined as the ability of a particular aluminosilicate material to retain surface area or nitrogen-adsorption capacity after contact with water or water vapor. A sodium-form of the ultrastable, large-pore crystalline aluminosilicate material (about 2.15 wt. % sodium) was shown to have a loss in nitrogen-absorption capacity that is less than 2% per wetting, when tested for stability to wetting by subjecting the material to a number of consecutive cycles, each cycle consisting of a wetting and a drying.

The ultrastable, large-pore crystalline aluminosilicate material that is preferred for the catalytic composition of this invention exhibits a cubic unit cell dimension and hydroxyl infrared bands that distinguish it from other aluminosilicate materials. The cubic unit cell dimension of the preferred ultrastable, large-pore crystalline aluminosilicate is within the range of about 24.20 Angstrom units (Å) to about 24.55 Å. The hydroxyl infrared bands obtained with the preferred ultrastable, large-pore crystalline aluminosilicate material are a band near 3,745 cm$^{-1}$ (3,745±5 cm$^{-1}$), a band near 3,695 cm$^{-1}$ (3,690±10 cm$^{-1}$), and a band near 3,625 cm$^{-1}$(3,610±15 cm$^{-1}$). The band near 3,745 cm$^{-1}$ may be found on many of the hydrogen-form and decationized aluminosilicate materials, but the band near 3,695 cm$^{-1}$ and the band near 3,625 cm$^{-1}$ are characteristic of the preferred ultrastable, large-pore crystalline aluminosilicate material that is used in the catalyst of the present invention.

The ultrastable, large-pore crystalline aluminosilicate material is characterized also by an alkaline metal content of less than 1%.

Other examples of crystalline molecular sieve zeolites that are suitable for the catalyst of the present invention are a high-sodium Y-type crystalline aluminosilicate such as the sodium-Y molecular sieve designated Catalyst Base 30-200 and obtained from the Linde Division of Union Carbide Corporation and a low-sodium Y-type molecular sieve designated as low-soda Diuturnal-Y-33-200 and obtained from the Linde Division of Union Carbide Corporation.

Another example of a crystalline molecular sieve zeolite that can be employed in the catalytic composition of the present invention is a metal-exchanged Y-type molecular sieve. Y-type zeolitic molecular sieves are discussed in U.S. Pat. No. 3,130,007. The metal-exchanged Y-type molecular sieve can be prepared by replacing the original cation associated with the molecular sieve by a variety of other cations according to techniques that are known in the art. Ion exchange techniques have been disclosed in many patents, several of which are U.S. Pat. Nos. 3,140,249, 3,140,251, and 3,140,253. Specifically, a mixture of rare earth metals can be exchanged into a Y-type zeolitic molecular sieve and such a rare earth metal-exchanged Y-type molecular sieve can be employed suitably in the catalytic composition of the present invention. Specific examples of suitable rare earth metals are cerium, lanthanum, and praseodymium.

Another zeolitic molecular sieve material that is used in the catalytic composition of the present invention is ZSM-5 crystalline zeolitic molecular sieves. Descriptions of the ZSM-5 composition and its method of preparation are presented by Argauer, et al., in U.S. Pat. No. 3,702,886. This patent is incorporated by reference herein and made a part hereof.

An additional molecular sieve that can be used in the catalytic composition of the present invention is AMS-1B crystalline borosilicate, which is described in U.S. Pat. No. 4,269,813, which patent is incorporated by reference herein and made a part thereof.

A suitable AMS-1B crystalline borosilicate is a molecular sieve material having the following composition in terms of mole ratios of oxides:

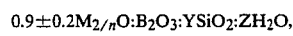

$$0.9 \pm 0.2 M_{2/n}O:B_2O_3:YSiO_2:ZH_2O,$$

wherein M is at least one cation having a valence of n, Y is within the range of 4 to about 600, and Z is within the range of 0 to about 160, and providing an X-ray diffraction pattern comprising the following X-ray diffraction lines and assigned strengths:

| d(Å) | Assigned Strength |
| --- | --- |
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M |

Mordenite-type crystalline aluminosilicates can be employed in the catalyst of the present invention. Mordenite-type crystalline aluminosilicate zeolites have been discussed in patent art, e.g., by Kimberlin in U.S. Pat. No. 3,247,098, by Benesi, et al., in U.S. Pat. No. 3,281,483, and by Adams, et al., in U.S. Pat. No.

3,299,153. Those portions of each of these patents which portions are directed to mordenite-type aluminosilicates are incorporated by reference and made a part hereof.

The present invention is described in further detail in connection with the following Example, it being understood that the example is for purposes of illustration and not limitation.

EXAMPLE

The process of the invention was compared with several alternative processes utilizing hydrocracking catalysts of differing compositions.

The comparative catalyst and the catalysts in accordance with the invention were used to convert a light catalytic cycle oil feedstock to naphtha and distillate products thereby determining the hydrodenitrogenation, hydrocracking, and polyaromatic saturation activities.

Table 1 below sets out the properties of the feedstock used in each test run.

TABLE 1

| Feed Properties | |
|---|---|
| API gravity | 21.9 |
| C, % | 89.58 |
| H, % | 10.37 |
| S, % | 0.55 |
| N, ppm | 485 |
| Total aromatics, wt % | 69.5 |
| Polyaromatics, wt % | 42.2 |
| Simulated distillation, °F. | |
| IBP, wt % | 321 |
| 10 | 409 |
| 25 | 453 |
| 50 | 521 |
| 75 | 594 |
| 90 | 643 |
| FBP | 756 |

The following Table 2 sets out the composition of each catalyst used in the present example to convert the feed described in Table 1. Catalysts D and F are in accordance with the present invention whereas the remaining catalysts are comparative. Commercial catalyst (I) is a commercially available high activity hydrocracking catalyst. Commercial catalyst (II) is a commercially available denitrogenation catalyst.

TABLE 2

| Catalyst | Metals (wt %) | USY Sieve (%) | Support |
|---|---|---|---|
| A | NiO(3.5)WO$_3$(18.0) | 0 | $\gamma$-Al$_2$O$_3$ |
| B (inv) | NiO(2.0)WO$_3$(18.0) | 35 | $\gamma$-Al$_2$O$_3$ |
| C (inv) | NiO(2.0)WO$_3$(18.0) | 50 | $\gamma$-Al$_2$O$_3$ |
| D | NiO(2.0)WO$_3$(18.0) | 35 | SiO$_2$-Al$_2$O$_3$ |
| E | NiO(3.0)MoO$_3$(18.0)P(1.5) | 35 | $\gamma$-Al$_2$O$_3$ |
| F | CoO(3.0)MoO$_3$(10.0) | 35 | SiO$_2$—Al$_2$O$_3$ |
| G (inv) | NiO(2.0)WO$_3$(18.0) P$_2$O$_5$(0.75) | 35 | Al$_2$O$_3$ |
| H | NiO(3.5)MoO$_3$(18.0) P$_2$O$_3$(3.0) | 35 | Al$_2$O$_3$ |
| Commercial (I) | NiO MoO$_3$ | High | Unknown |
| Commercial (II) | NiO MoO$_3$ | 0 | $\gamma$-Al$_2$O$_3$ |

Each catalyst was first tested to determine its hydrodenitrogenation activity, and a polycyclic aromatic saturation activity.

The reaction conditions for hydrodenitrogenation (HDN) and polycyclic aromatic saturation include a temperature of 675° F., and pressure of 1250 psig. The test reactor contained 4.0 grams of catalyst crushed to a 14/20 mesh size for each test run. The feed rates were 40 g/hr and 60 g/hr for the hydrodenitrogenation tests and polycyclic aromatic saturation tests respectively.

Using Catalyst D as a reference for the determination of all activities, the relative activities for HDN were calculated by equation 1:

$$HDN \text{ Act} = \frac{\log (N_F/N_P)}{\log (N_f/N_p)_{ref}} \quad (1)$$

N$_f$ and N$_p$ are the nitrogen concentration in the feed and product, respectively and N$_F$ and N$_P$ are the nitrogen concentration in the feed and product respectively for the reference catalyst. Similarly, the polyaromatic saturation activity (naphthalene saturation) was determined according to equation 2:

$$\text{Polyaromatic Saturation Act} = \frac{\log (Nap_F/Nap_P)}{\log (Nap_f/Nap_p)_{ref}} \quad (2)$$

Nap$_f$ and Nap$_p$ are the concentration of naphthalene in the feed and the product, respectively. Nap$_F$ and Nap$_P$ are the concentration of naphthalene in the feed and product respectively for the reference catalyst.

In order to determine the hydrocracking activity for each catalyst, the amount of catalyst used in each run was increased to 18.75 g. The catalyst used in each run was crushed to a 14/20 mesh size. Each test run was carried out at a temperature sufficient to obtain about 77 wt. % conversion of the reactor influent to material having a boiling range less than about 380° F. The WHSV was 1.6 and the reactor pressure was 1250 psig. The hydrocracking activity was determined by equation 3:

$$\text{Hydrocracking Act} = e^{-35,000/R(\frac{1}{T} - \frac{1}{T_{ref}})} \quad (3)$$

In equation 3, R is the gas constant 1.987 cal/° K., the temperature is in degrees Kelvin where T designates the temperature at which the conversion takes place and T$_{ref}$ is 658.2° K., and 35,000 cal is the activation energy for hydrocracking. The catalyst activities certain of the catalysts from Table 2 is given below in Table 3.

TABLE 3

| | Activities | | |
|---|---|---|---|
| Catalyst | HDN | Polyaromatic Saturation | Hydrocracking |
| A | 1.1 | 2.3 | None |
| B (inv) | 1.3 | 2.0 | 1.2 |
| C (inv) | 1.2 | 2.0 | 1.3 |
| D | 1.0 | 1.0 | 1.0 |
| E | 1.3 | 1.0 | 0.5 |
| F | 0.4 | 0.4 | 0.4 |
| Commercial (I) | 0.6 | 0.3 | 1.0 |
| Commercial (II) | 1.6 | None | 1.0 |

An inspection of Table 3 shows that for each of the activities, CoMo on 35% USY sieve dispersed in a SiO$_2$-Al$_2$O$_3$ matrix (Catalyst F) is the least active.

Further, the addition of 35% USY sieve (invention Catalyst B) or 50% USY sieve (invention Catalyst C) to NiW on $\gamma$-Al$_2$O$_3$ (Catalyst A) increased the HDN activity and hydrocracking activity. Invention Catalysts B and C, therefore, are better for HDN than are traditional nonsieve-containing hydrodenitrogenation catalysts (such as Catalyst A the commercial (II) catalyst).

Catalysts D and B are identical (2% NiO, 18% WO$_3$ and 35% USY) except for the support composition. The support for Catalyst B in accordance with the present invention is $\gamma$-Al$_2$O$_3$, while the support for Catalyst D is silica-alumina. The HDN and hydrocracking activities for Catalyst B (1.3 and 1.2, respectively) are higher than those for Catalyst D (1.0 and 1.0). In addition Catalyst B has a much higher polyaromatic saturation activity (2.0) than Catalyst D (1.0). For each of these reactions, $\gamma$-Al$_2$O$_3$ in accordance with the invention is a preferred support component when nickel and tungsten are used as hydrogenation components.

Commercial HDN catalysts most often contain NiMo or phosphorus-promoted NiMo supported on $\gamma$-Al$_2$O$_3$. As can also be seen from Table 3, NiW and NiMo are equally active for HDN. For example, the HDN activity of Catalyst A (NiW) and the commercial (II) catalyst are 1.1 and 1.0 respectively. Both Catalyst A and the commercial (II) catalyst are non-sieve catalysts with the metals supported on $\gamma$-Al$_2$O$_3$. Similarly, the HDN activities for invention Catalyst B (NiW) and Catalyst E (NiMo) are the same. Both catalysts B and E, had the same support, namely: 35% USY sieve dispersed in $\gamma$-Al$_2$O$_3$. However, while the HDN activities for Catalysts B and E are the same, the hydrocracking activity for invention Catalyst B is substantially higher (1.2 vs. 0.5) than that of Catalyst E. This test also shows that at the same molecular sieve level and with the same support, the use of NiW, in accordance with the present invention, is much more effective for hydrocracking than is the use of NiMo as the hydrogenation component.

The product selectivities for several comparative catalysts and the catalysts of the invention were determined. Table 4 below sets out the reaction conditions, conversion, and selectivities for each test run. The reactor catalyst loadings are also set out. The WHSV was adjusted to give about the same conversion for each test run.

TABLE 4

| Run No. | 1 | 2 | 3 | 4 | 5 | 6 | 7 |
|---|---|---|---|---|---|---|---|
| Catalyst loading, g: | 6.25B 12.50C | 18.75B | 18.75 commercial (I) | 6.25D 12.50F | 18.75H | 18.75G 12.50F | 6.25B |
| Operating Conditions: | | | | | | | |
| Pressure, psi | 1250 | 1250 | 1250 | 1250 | 1250 | 1250 | 1250 |
| Temperature, °F. | 712 | 706 | 703 | 724 | 726 | 701 | 716 |
| WHSV, hr-1 | 1.57 | 1.66 | 1.44 | 1.57 | 1.58 | 1.69 | 1.63 |
| % Conversion to 380° F. | 77.1 | 76.7 | 76.6 | 76.9 | 76.0 | 77.0 | 76.0 |
| Product Selectivity | | | | | | | |
| C$_1$–C$_3$ | 3.08 | 2.68 | 3.49 | 3.93 | 3.55 | 2.47 | 3.28 |
| C$_4$ | 8.07 | 8.13 | 8.21 | 8.58 | 8.22 | 8.15 | 8.08 |
| C$_5$ | 7.27 | 7.09 | 7.61 | 7.93 | 7.61 | 7.44 | 7.54 |
| C$_6$–180° F. naphtha | 11.98 | 11.72 | 11.43 | 11.50 | 11.62 | 12.67 | 11.60 |
| 180–380° F. naphtha | 46.71 | 47.16 | 45.84 | 44.93 | 44.96 | 46.20 | 45.55 |
| 380°+ | 22.90 | 23.30 | 23.40 | 23.10 | 24.00 | 23.00 | 24.00 |

The following Table 5 below sets out the product analysis for each test run in Table 4 above.

TABLE 5

| | Product Analysis | | | | | | |
|---|---|---|---|---|---|---|---|
| Run No. | 1 | 2 | 3 | 4 | 5 | 6 | 7 |
| Total product | | | | | | | |
| API gravity | 52.1 | 52.7 | 48.8 | 40.5 | 49.7 | 51.8 | 51.1 |
| % C | 86.13 | 85.90 | 86.70 | 86.80 | 86.75 | 85.95 | 85.54 |
| % H | 13.87 | 14.10 | 13.30 | 13.20 | 13.24 | 14.05 | 13.46 |
| Total aromatics, | 20.6 | 15.0 | 32.5 | 36.0 | 31.9 | 14.4 | 30.1 |

TABLE 5-continued

| | Product Analysis | | | | | | |
|---|---|---|---|---|---|---|---|
| Run No. | 1 | 2 | 3 | 4 | 5 | 6 | 7 |
| wt % | | | | | | | |
| Polyaromatics, | 0.1 | 0.0 | 0.3 | 0.4 | 0.3 | 0.4 | 0.2 |
| wt % | | | | | | | |
| Naphtha | | | | | | | |
| API gravity | 53.8 | 55.4 | 51.0 | 56.8 | 51.3 | 57.2 | 55.4 |
| % C | 86.26 | 85.99 | 86.76 | 86.45 | 86.84 | 85.93 | 86.24 |
| % H | 13.74 | 14.01 | 13.24 | 13.55 | 13.16 | 14.07 | 13.76 |
| Paraffins, wt % | 31.4 | 33.8 | 30.3 | 39.3 | 31.6 | 35.2 | 36.3 |
| Naphthenes, wt % | 49.9 | 52.6 | 41.0 | 31.2 | 39.6 | 51.9 | 38.4 |
| Aromatics, wt % | 18.7 | 13.6 | 28.7 | 29.5 | 28.8 | 13.0 | 25.3 |
| Distillate | | | | | | | |
| API gravity | 39.3 | 40.1 | 35.9 | 35.6 | 35.6 | 41.4 | 37.5 |
| % C | 86.77 | 86.42 | 88.12 | 87.79 | 87.38 | 86.38 | 87.43 |
| % H | 12.23 | 13.58 | 12.62 | 12.21 | 12.62 | 13.62 | 12.57 |
| Total aromatics, wt % | 31.3 | 20.2 | 48.4 | 56.0 | 49.6 | 17.0 | 46.7 |
| Polyaromatics, wt % | 1.1 | 1.0 | 2.7 | 3.3 | 3.0 | 1.1 | 2.6 |

As is evident from the above Table 4, when operated at the same conversion, the commercial catalyst (I) is less naphtha selective than the catalyst of the invention exemplified in runs 1, 2, and 6. The commercial catalyst also has a higher selectivity to undesirable C$_1$–C$_5$ light gas products. Also, the process of the invention was more naphtha selective than the processes exemplified in comparative runs 4, 5, and 7. Specifically, the catalyst blend used in run 4 contained ⅓ catalyst D and ⅔ catalyst F. Catalyst D contained silica-alumina in its support not in accordance with the present invention, while catalyst F contained Co, Mo, and silica-alumina not in accordance with the present invention. Catalyst H, used in run 5, contained Mo not in accordance with the invention and displayed a lower naphtha yield than the process of the invention. Additionally, in run 7 where 2/3 of the catalyst blend was catalyst F, the naphtha yield was similarly lower. All of the light gas yields for the invention catalysts were also lower than those determined in comparative runs 4, 5, and 7.

The distillate fractions prepared using the catalysts of the invention as shown in Table 5; i.e., runs 1, 2, and 6 have markedly lower aromatics contents than the distillate fractions yielded by the comparative processes rendering the invention fractions suitable for the use in preparing diesel fuel and jet fuel.

What is claimed is:

1. A process for the hydrocracking of a feedstock comprising a light catalytic cycle oil having a boiling range from about 350° F. to about 750° F. which comprises reacting the feedstock with hydrogen at hydrocracking conversion conditions in the presence of a catalyst comprising a hydrogenation component comprising a nickel component and a tungsten component wherein the nickel component is present in an amount ranging from about 1 to about 10 wt. % and the tungsten component is present in an amount ranging from about 10 to about 30 wt. %, both calculated as oxides and based on the total catalyst weight and a support component consisting essentially of a crystalline molecular sieve component and an alumina component wherein the crystalline molecular sieve component is present in the support in an amount less than about 60 wt. % and greater than about 25 wt. % based on the total weight of the support component.

2. The process of claim 1 wherein said hydrogenation component also contains a phosphorus component present in an amount ranging from about 0.0 to 5.0 wt. % calculated as the oxide and based on total catalyst weight.

3. The process of claim 1 wherein said alumina component is gamma alumina.

4. The process of claim 1 wherein said crystalline molecular sieve component is a Y zeolite.

5. The process of claim 1 wherein said light catalytic cycle oil contains at least about 30 vol. % aromatics.

6. The process of claim 1 wherein said nickel component is present in an amount ranging from about 1.5 to about 5.0 wt. %, said tungsten component is present in an amount ranging from about 15 to about 25 wt. %, both calculated as oxides, and said crystalline molecular sieve component is present in an amount less than about 50 wt. % and greater than about 35 wt. % based on the total weight of said support component.

7. The process of claim 6 wherein said hydrogenation component also contains a phosphorus component present in an amount ranging from about 0.0 to about 2.0 wt. % calculated as the oxide and based on total catalyst weight.

8. The process of claim 6 wherein said alumina component is gamma alumina.

9. The process of claim 6 wherein said crystalline molecular sieve component is a Y zeolite.

10. The process of claim 6 wherein said light catalytic cycle oil contains at least about 30 vol. % aromatics.

11. The process of claim 1 wherein said nickel component is present in an amount ranging from about 1.5 to about 4.0 wt. %, said tungsten component is present in an amount ranging from about 15 to about 20 wt. %, both calculated as oxides, and said crystalline molecular sieve component is present in an amount less than about 50 wt. % and greater than about 35 wt. % based on the weight of support component.

12. The process of claim 11 wherein said hydrogenation component also contains a phosphorus component present in an amount ranging from about 0.0 to about 1.0 wt. % calculated as the oxide and based on total catalyst weight.

13. The process of claim 11 wherein said alumina component is gamma alumina.

14. The process of claim 11 wherein said crystalline molecular sieve component is a Y zeolite.

15. The process of claim 11 wherein said light catalytic cycle oil contains at least about 30 vol. % aromatics.

* * * * *